United States Patent
Hama et al.

(10) Patent No.: US 10,303,917 B2
(45) Date of Patent: May 28, 2019

(54) BIOMETRIC IMAGE PROCESSING APPARATUS AND BIOMETRIC IMAGE PROCESSING METHOD

(71) Applicant: FUJITSU LIMITED, Kawasaki-shi, Kanagawa (JP)

(72) Inventors: Soichi Hama, Atsugi (JP); Satoshi Semba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 5 days.

(21) Appl. No.: 15/457,440

(22) Filed: Mar. 13, 2017

(65) Prior Publication Data

US 2017/0277934 A1    Sep. 28, 2017

(30) Foreign Application Priority Data

Mar. 25, 2016   (JP) ................................. 2016-062462

(51) Int. Cl.
*G06K 9/00* (2006.01)

(52) U.S. Cl.
CPC ....... *G06K 9/0004* (2013.01); *G06K 9/00013* (2013.01); *G06K 9/00087* (2013.01); *G06K 2009/00932* (2013.01)

(58) Field of Classification Search
None
See application file for complete search history.

(56) References Cited

U.S. PATENT DOCUMENTS

| | | | |
|---|---|---|---|
| 2006/0018514 A1* | 1/2006 | Bankhead | G01B 11/303 382/108 |
| 2007/0285541 A1* | 12/2007 | Nakashiba | G06K 9/0004 348/272 |
| 2009/0036783 A1 | 2/2009 | Kishima | |
| 2011/0298909 A1* | 12/2011 | Ando | H04N 5/2256 348/77 |
| 2013/0076911 A1 | 3/2013 | Nakashiba | |
| 2014/0114189 A1* | 4/2014 | Kanayama | G01S 7/52046 600/438 |
| 2015/0287170 A1* | 10/2015 | Hong | G06T 5/002 382/274 |

FOREIGN PATENT DOCUMENTS

| | | |
|---|---|---|
| EP | 2848196 A1 | 3/2015 |
| JP | 2002-200050 | 7/2002 |

(Continued)

OTHER PUBLICATIONS

Takaaki Maeda et al., "Monte Carlo Simulation of Spectral Reflectance Using a Multilayered Skin Tissue Model", Optical Review vol. 17, No. 3, (2010), pp. 223-229 (7 pages).

(Continued)

*Primary Examiner* — Hadi Akhavannik
(74) *Attorney, Agent, or Firm* — Fujitsu Patent Center

(57) ABSTRACT

A biometric image processing apparatus includes an imaging device that captures a first image of a biometric part that is irradiated with light having a first wavelength, and a second image of the biometric part irradiated with light having a second wavelength shorter than the first wavelength, and a computing device that computes a third image by subtracting from the first image an image in which a luminance of the second image is attenuated.

20 Claims, 5 Drawing Sheets

(56) References Cited

FOREIGN PATENT DOCUMENTS

| | | |
|---|---|---|
| JP | 2007-323389 | 12/2007 |
| JP | 2009-028427 | 2/2009 |

OTHER PUBLICATIONS

Yoshinaga Aizu, "Skin Tissue Multilayered Structure Modeling and Light Propagation Simulation", Journal of the Japan Society of Mechanical Engineers (JSME), (Jul. 2011), vol. 114, No. 1112, p. 39 (1 page) with partial English translation.
European Search Report dated Aug. 4, 2017 for the corresponding European Patent Application No. 17160531.4, 12 pages.
European Office Action dated Apr. 9, 2019 for corresponding European Patent Application No. 17160531.4, 3 pages.

\* cited by examiner

BIOMETRIC IMAGE PROCESSING APPARATUS AND BIOMETRIC IMAGE PROCESSING METHOD

CROSS-REFERENCE TO RELATED APPLICATIONS

This application is based upon and claims the benefit of priority of the prior Japanese Patent Application No. 2016-062462, filed on Mar. 25, 2016, the entire contents of which are incorporated herein by reference.

FIELD

The embodiments discussed herein are related to a biometric image processing apparatus and a biometric image processing method.

BACKGROUND

Biometric authentication (or biometrics authentication) identifies a user using biometric features of the user, such as fingerprint, face, vein, or the like of the user. Vein authentication captures subcutaneous vein patterns to acquire the biometric features. Because the vein authentication identifies the user using internal information, the vein authentication provides an authentication accuracy that is higher compared to those provided by authentications that identify the user using information such as the fingerprint, face, or the like.

In order to perform the vein authentication, light is irradiated on a biometric part to capture the vein pattern. For example, the light irradiated on the biometric light may be near-infrared light that penetrates skin and reaches inside the biometric part. The biometric part, such as a finger, hand, or the like, has a multi-layered structure including skin and internal structure. Hence, an appearance of the biometric part may be represented by a dichroic reflection model. In other words, in a case in which light is irradiated on the biometric part, returning light from the biometric part is a mixture of light reflected at a surface of the biometric part (that is, skin surface) and light scattered inside the biometric part. Because veins are located under the skin, an image caused by surface reflection is eliminated, and only an image caused by internal scattering is obtained, in order to observe the veins with a high accuracy.

The image caused by surface reflection and the image caused by internal scattering may be separated using polarization properties. For example, Japanese Laid-Open Patent Publication No. 2002-200050 proposes a technique that uses a polarization filter to eliminate effects of surface reflection. The light reflected at the surface of the biometric part maintains the polarization state thereof. On the other hand, the light scattered inside the biometric part randomly change the polarization state thereof. For this reason, when the polarization filter is arranged at a subsequent stage of an illumination end and at a preceding stage of an observation end so that the polarization directions at the illumination end and the observation end become parallel, the polarization filters cut an internally scattered light component, and a surface reflection light component can be observed by a detector. On the other hand, when the polarization filter is arranged at the subsequent stage of the illumination end and at the preceding stage of the observation end so that the polarization directions at the illumination end and the observation end become perpendicular, the polarization filters cut the surface reflection light component, and the internally scattered light component can be observed by the detector.

However, the polarization filter transmits only the light having a particular polarization direction, and cuts light having polarization directions other than the particular polarization direction by reflecting or absorbing the light having polarization directions other than the particular polarization direction. Consequently, an amount of light that can be received by the detector via the polarization filter decreases, and image noise increases, thereby making it difficult to obtain a clear biometric image. In addition, a polarization filter that can be used in a near-infrared range is expensive. As a result, when providing the polarization filter that can be used in the near-infrared range, a cost of the biometric image processing apparatus increases.

Therefore, it is difficult to obtain a clear biometric image by a conventional biometric image processing apparatus.

Examples of related art include Japanese Laid-Open Patent Publications No. 2002-200050, No. 2007-323389, and No. 2009-028427, Takaaki Maeda et al., "Monte Carlo Simulation of Spectral Reflectance Using a Multilayered Skin Tissue Model", Optical Review Vol. 17, No. 3, (2010), pp. 223-229, and Yoshinaga Aizu, "Skin Tissue Multilayered Structure Modeling and Light Propagation Simulation", Journal of the Japan Society of Mechanical Engineers (JSME), 2011.7, Vol. 114, No. 1112, p. 39.

SUMMARY

Accordingly, it is an object in one aspect of the embodiments to provide a biometric image processing apparatus and a biometric image processing method, which can obtain a clear biometric image.

According to one aspect of the embodiments, a biometric image processing apparatus includes an imaging device configured to capture a first image of a biometric part that is irradiated with light having a first wavelength, and a second image of the biometric part irradiated with light having a second wavelength shorter than the first wavelength; and a computing device configured to compute a third image by subtracting from the first image an image in which a luminance of the second image is attenuated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

A description will now be given of the biometric image processing apparatus and the biometric image processing method in each embodiment according to the present invention.

Figure 1:
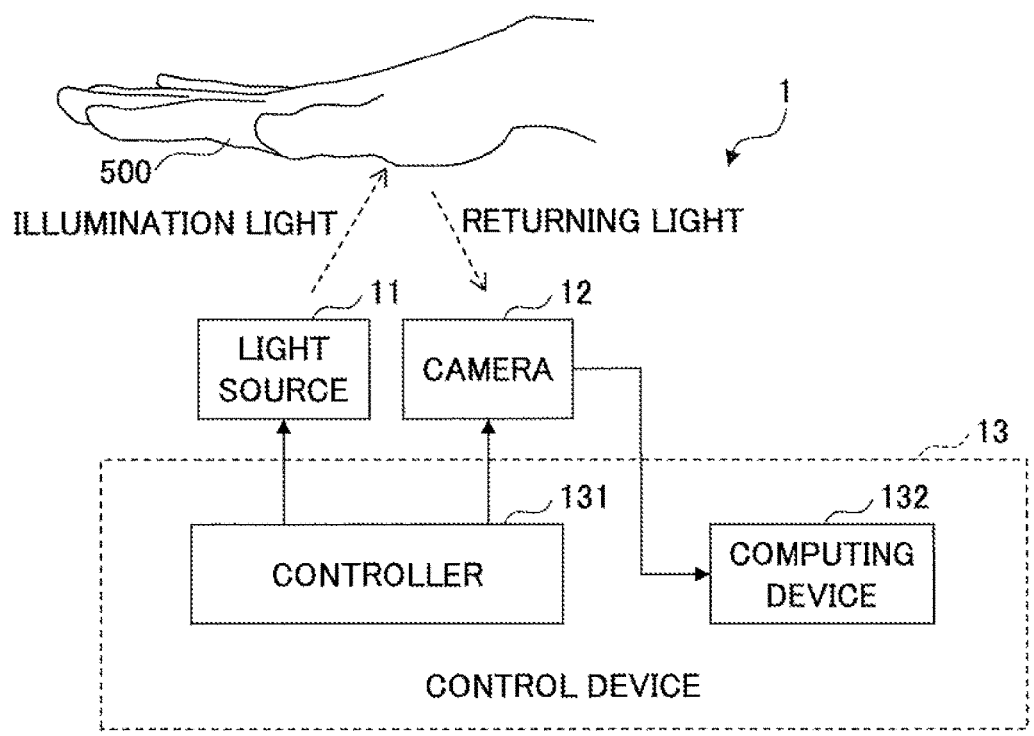
FIG. 1 is a diagram illustrating an example of a biometric image processing apparatus in one embodiment.

FIG. 1 is a diagram illustrating an example of the biometric image processing apparatus in one embodiment. A biometric image processing apparatus 1 illustrated in FIG. 1 includes a light source 11, a camera 12, and a control device 13.

The light source 11 irradiates illumination light on a biometric part 500 that is an example of a capture (or imaging) target. The light source 11 irradiates light having two or more mutually different wavelengths. The light source 11 may be formed by a single light source that irradiates light having wavelengths including both long-wavelength and short-wavelength, as described later in conjunction with FIGS. 3 and 4. In addition, the light source 11 may be formed by a plurality of light sources, such as a first light source that irradiates light having long-wavelength and a second light source that irradiates light having short-wavelength, as described later in conjunction with FIGS. 6 and 7. The light having the long-wavelength is an example of light having a first wavelength, and the light having the short-wavelength is an example of light having a second wavelength shorter than the first wavelength. The light having the long-wavelength has a wavelength longer than 600 nm, for example, and the light having the short-wavelength has a wavelength of 600 nm or shorter.

The camera 12 receives returning light from the biometric part 50 that is irradiated with the illumination light, and is an example of an imaging device (or imaging means) that captures an image of the biometric part 500. The camera 12 captures a first image of the biometric part 500 irradiated with the light having the long-wavelength, and a second image of the biometric part 500 irradiated with the light having the short-wavelength. In this example, the biometric part 500 is a palm of a person who is a target to be identified, and the camera 12 captures an image of the palm.

The control device 13 includes a controller 131 that controls the light source 11 and the camera 12, and a computing device 132 that performs a computing process on the image captured by the camera 12. The control device 13 may be formed by a processor, such as a CPU (Central Processing Unit) or the like. The control device 13 may include a memory (not illustrated) that stores, among other things, a program executed by the processor. In this example, the computing device 132 computes a third image by subtracting from the first image of the biometric part 500 captured by the camera 12 an image in which a luminance of the second image of the biometric part 500 captured by the camera 12 is attenuated. An attenuation rate at which the luminance of the second image is attenuated may be determined according to an intensity of a component of surface reflection light included in the first image. In this example, the computing device 132 obtains an image of veins of the palm, or an image of a palm vein pattern, from the image of the palm captured by the camera 12.

In FIG. 1, the biometric part 500, that is an example of the capture target, is located above the biometric image processing apparatus 1. However, a position of the biometric part 500 with respect to the biometric image processing apparatus 1 is not limited to a particular location. In addition, the position of the biometric part with respect to the biometric image processing apparatus is also not limited to a particular location in each of the embodiments described later in conjunction with FIGS. 3, 4, 6, and 7. In FIGS. 1, 3, 4, 6, and 7, dotted-line arrows represent paths of the illumination light and the returning light.

Figure 2:
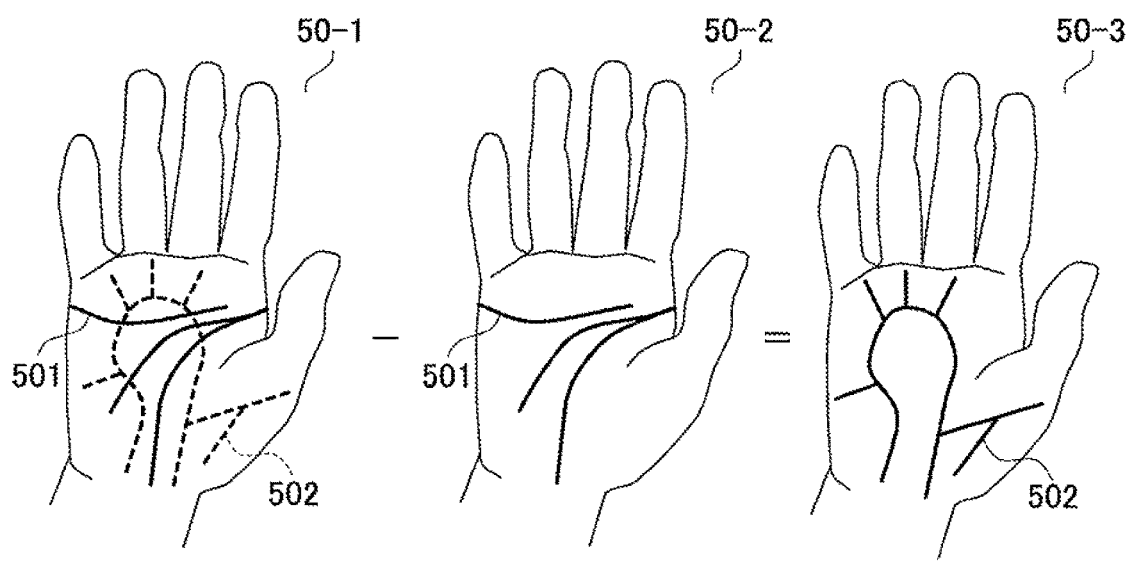
FIG. 2 is a diagram for explaining acquisition of images by internal scattering.

FIG. 2 is a diagram for explaining acquisition of images by internal scattering. For the sake of convenience, FIG. 2 illustrates contours of the palm with respect to each image. In FIG. 2, a first image 50-1 is the image of the biometric part 500 irradiated with the light having the long-wavelength and captured by the camera 12. In the first image 50-1, a bold solid line indicates a pattern 501 on a biometric surface of the biometric part 500, such as a wrinkle or the like on a skin surface of the palm. In addition, a bold dotted line in the first image 50-1 indicates a vein pattern 502 under the skin. Accordingly, the first image 50-1 includes information of the skin surface of the biometric part 500, and subcutaneous information of the biometric part 500. A second image 50-2 is the image of the biometric part 500 irradiated with the light having the short-wavelength and captured by the camera 12. In the second image 50-2, a bold solid line indicates the pattern 501 on the biometric surface of the biometric part 500, such as the wrinkle or the like on the skin surface of the palm. Accordingly, the second image 50-2 mainly includes the information of the skin surface of the biometric part 500. A third image 50-3 is the image obtained by subtracting from the first image 50-1 the image in which the luminance of the second image 50-2 is attenuated. In the third image 50-3, a bold solid line indicates the vein pattern 502 under the skin.

This embodiment separates a surface component and an internal component of the image by utilizing a depth of light, that penetrates the surface of an object and reaches inside the object, and differs depending on the wavelength of the light. Light more easily scatters as the wavelength thereof becomes shorter, and light more easily penetrates the surface of the object and reaches inside the object as the wavelength thereof becomes longer. In a case in which the capture target on which the light is irradiated is a biometric part, the light also more easily penetrates the skin and reaches inside the biometric part as the wavelength of the light becomes longer. Accordingly, light having the long-wavelength and light having the short-wavelength are simultaneously irradiated or sequentially irradiated on the biometric part, in order to observe the image for each wavelength.

Of the returning light from the biometric part, the long-wavelength component penetrates the skin, reaches inside the biometric part, and scatters inside the biometric part, and for this reason, the intensity of the long-wavelength component decreases. On the other hand, of the returning light from the biometric part, the short-wavelength component is reflected at the skin surface of the biometric part, and a decrease in the intensity of the short-wavelength component is small compared to that of the long-wavelength component. Hence, the third image caused by internal scattering of the biometric part, that is, the image of the vein pattern, is obtained by subtracting from the first image caused by the light having the long-wavelength, the image in which the luminance of the second image caused by the light having the short-wavelength, is attenuated. In other words, when obtaining the third image from a difference between the first image and the second image, the difference is obtained by first adjusting the luminance of the first image and the second image.

Figure 3:
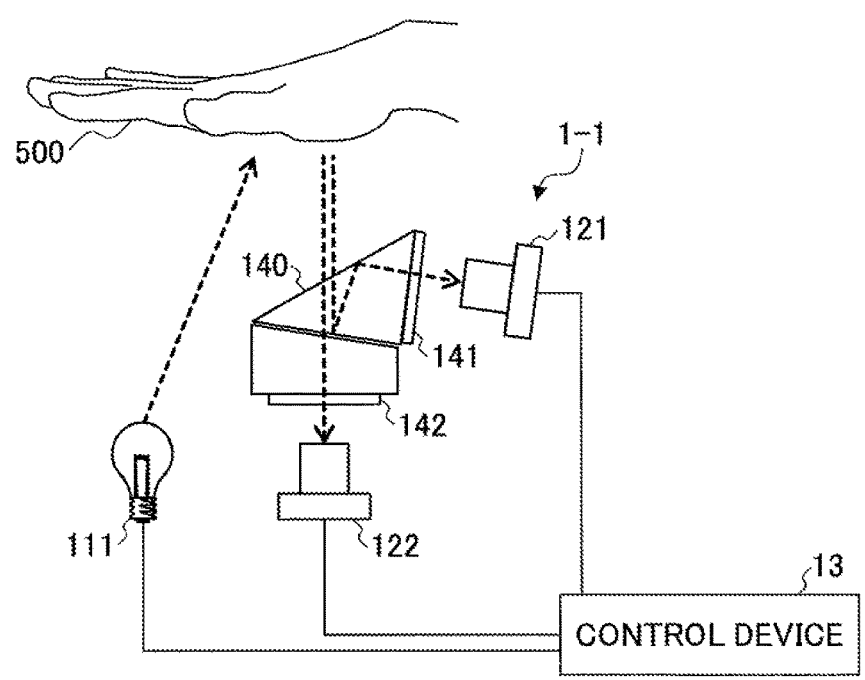
FIG. 3 is a diagram illustrating an example of the biometric image processing apparatus in a first embodiment.

FIG. 3 is a diagram illustrating an example of the biometric image processing apparatus in a first embodiment. In FIG. 3, those parts that are the same as those corresponding parts in FIG. 1 are designated by the same reference numerals, and a description thereof will be omitted. In this embodiment, the light having the long-wavelength and the light having the short-wavelength are simultaneously irradiated on the biometric part, in order to observe the image for each wavelength.

In a biometric image processing apparatus 1-1 illustrated in FIG. 3, a white lamp 111 is an example of the light source 11. The white lamp 111 irradiates white light having wavelengths including the long-wavelength and the short-wavelength on the biometric part 500. A first camera 121 and a second camera 122 form an example of the imaging device (or imaging means). The returning light from the biometric part 500 is split and separated into two paths by a prism 140. Light traveling in one of the two paths reaches the first camera 121 via a wavelength filter 141, and light traveling in the other of the two paths reaches the second camera 122 via a wavelength filter 142. The first camera 121 and the second camera 122 are arranged at positions so that optical axes thereof match, in order to avoid parallax.

The prism 140 and the wavelength filters 141 and 142 form an example of a separator (or separating means) that separates the returning light from the biometric part 500 into the long-wavelength component and the short-wavelength component. The prism 140 splits and separates the returning light from the biometric part 500 into two paths. The band-limiting wavelength filter 141 cuts the short-wavelength component of the returning light in one of the two paths, and transmits the long-wavelength component of this returning light in the same path to supply this long-wavelength component to the first camera 121. The band-limiting wavelength filter 142 cuts the long-wavelength component of the returning light in the other of the two paths, and transmits the short-wavelength component of this returning light in the same path to supply this short-wavelength component to the second camera 122. Accordingly, the first camera 121 supplies to the control device 13 the first image 50-1 illustrated in FIG. 2 that is captured based on the long-wavelength component of the returning light. On the other hand, the second camera 122 supplies to the control device 13 the second image 50-2 illustrated in FIG. 2 that is captured based on the short-wavelength component of the returning light.

A semi-transparent mirror may be used in place of the prism 140 to split and separate the returning light. However, it is more preferable to use the prism 140 because a loss in the intensity of light is smaller for the prism 140 when compared to that of the semi-transparent mirror.

Figure 4:
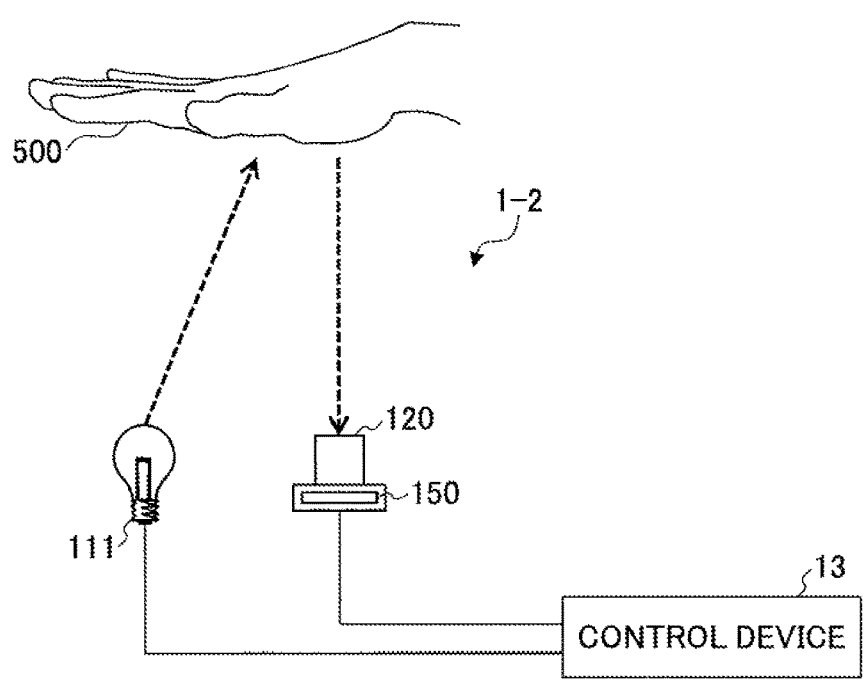
FIG. 4 is a diagram illustrating an example of the biometric image processing apparatus in a second embodiment.

FIG. 4 is a diagram illustrating an example of the biometric image processing apparatus in a second embodiment. In FIG. 4, those parts that are the same as those corresponding parts in FIG. 1 are designated by the same reference numerals, and a description thereof will be omitted. In this embodiment, the light having the long-wavelength and the light having the short-wavelength are simultaneously irradiated on the biometric part, in order to observe the image for each wavelength.

In a biometric image processing apparatus 1-2 illustrated in FIG. 4, a camera 120 is an example of the imaging device (or imaging means). In addition, a filter 150 is an example of a separator (or separating means) that separates the returning light from the biometric part 500 into the long-wavelength component and the short-wavelength component.

Figure 5:
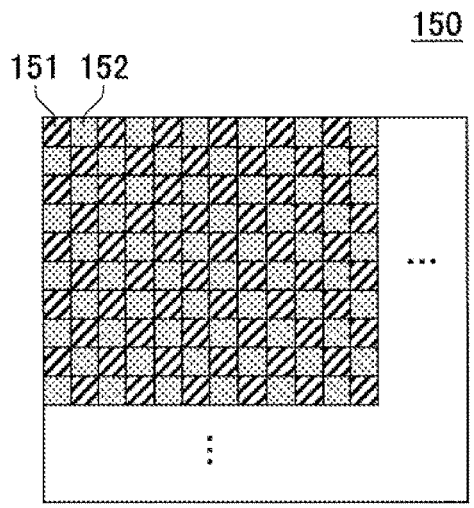
FIG. 5 is a diagram illustrating an example of a filter.

FIG. 5 is a diagram illustrating an example of the filter. The filter 150 illustrated in FIG. 5 includes a long-wavelength filter 151 or a short-wavelength filter 152 for each pixel of a light receiving element of the camera 120. In this example, the long-wavelength filter 151 and the short-wavelength filter 152 are alternately arranged for each pixel, along both a horizontal direction and a vertical direction of the filter 150. The long-wavelength filter 151 cuts the short-wavelength component of the returning light, and transmits the long-wavelength component of the returning light to supply this long-wavelength component to the camera 120. The short-wavelength filter 152 cuts the long-wavelength component of the returning light, and transmits the short-wavelength component of the returning light to supply this short-wavelength component to the camera 120. Accordingly, the camera 120 supplies to the control device 13 the first image 50-1 illustrated in FIG. 2 that is captured via the long-wavelength filter 151. On the other hand, the camera 120 supplies to the control device 13 the second image 50-2 illustrated in FIG. 2 that is captured via the short-wavelength filter 152. In this case, a number of effective pixels per image is reduced to ½, however, only one camera 120 is required. Hence, compared to a case in which two cameras are used, it is possible to reduce the cost of the biometric image processing apparatus 1-2. In addition, because only one camera 120 is required, unlike the case in which two cameras are used, it is unnecessary to make adjustments to match the optical axes of the two cameras to avoid parallax.

Figure 6:
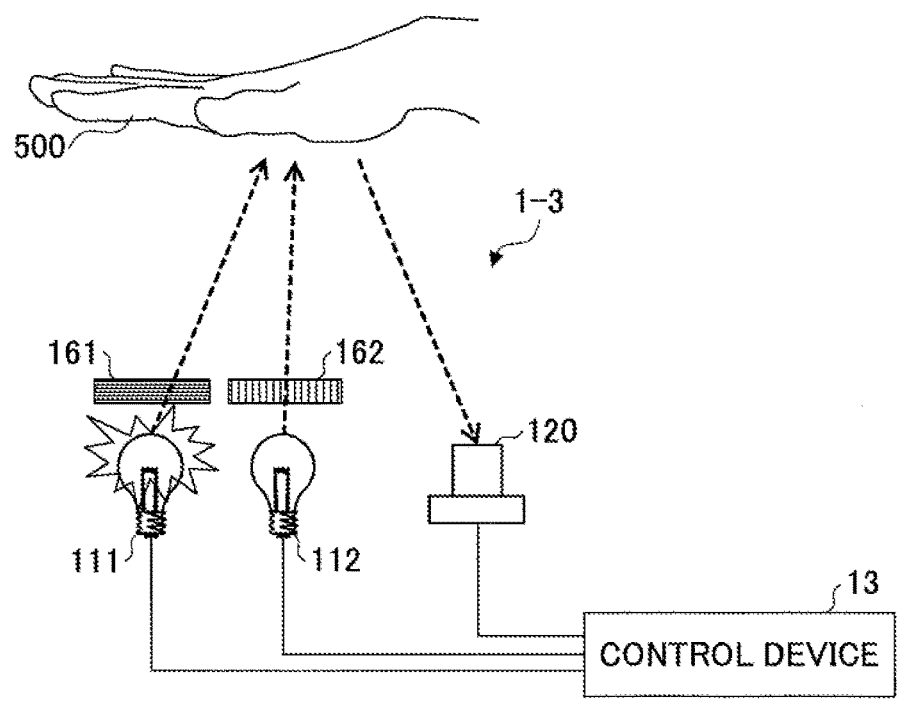
FIG. 6 is a diagram illustrating an example of the biometric image processing apparatus in a third embodiment.

FIG. 6 is a diagram illustrating an example of the biometric image processing apparatus in a third embodiment. In FIG. 6, those parts that are the same as those corresponding parts in FIG. 3 are designated by the same reference numerals, and a description thereof will be omitted. In this embodiment, the light having the long-wavelength and the light having the short-wavelength are sequentially irradiated on the biometric part, in order to observe the image for each wavelength.

In a biometric image processing apparatus 1-3 illustrated in FIG. 6, the white lamp 111 and a wavelength filter 161 form an example of a first light source. In addition, a white lamp 112 and a wavelength filter 162 form an example of a second light source. The band-limiting wavelength filter 161 transmits the long-wavelength component of the light emitted from the white lamp 11, to irradiate the long-wavelength component on the biometric part 500. On the other hand, the band-limiting wavelength filter 162 transmits the short-wavelength component of light emitted from the white lamp 112, to irradiate the short-wavelength component on the biometric part 500. The white lamp 111 and the white lamp 112 are controlled to alternately turn on by the controller 131 of the control device 13. In other words, the wavelength of the illumination light is switched at the illumination end, by successively irradiating light having the different wavelengths on the biometric part 500. For this reason, no special restrictions are imposed on the observation end (that is, the camera side). In this example, every time the light having the different wavelength is irradiated on the biometric part 500, the camera 120 captures one image of the biometric part 500.

Figure 7:
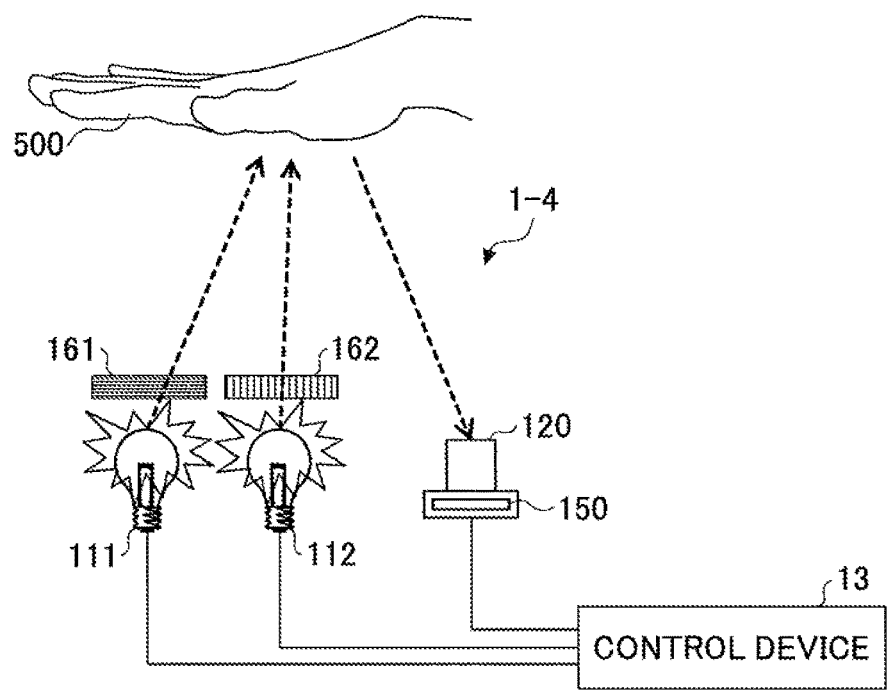
FIG. 7 is a diagram illustrating an example of the biometric image processing apparatus in a fourth embodiment.

FIG. 7 is a diagram illustrating an example of the biometric image processing apparatus in a fourth embodiment. In FIG. 7, those parts that are the same as those corresponding parts in FIGS. 4 and 6 are designated by the same reference numerals, and a description thereof will be omitted. In this embodiment, the light having the long-wavelength and the light having the short-wavelength are sequentially irradiated on the biometric part, in order to observe the image for each wavelength.

In a biometric image processing apparatus 1-4 illustrated in FIG. 7, the configuration of the observation end (that is, the camera side) is similar to that of the second embodiment illustrated in FIG. 4. On the other hand, the configuration of the illumination end is similar to that of the third embodiment illustrated in FIG. 6. In other words, the configuration of the observation end (that is, the camera side) and the configuration of the illumination end of different embodiments may be appropriately combined.

Figure 8:
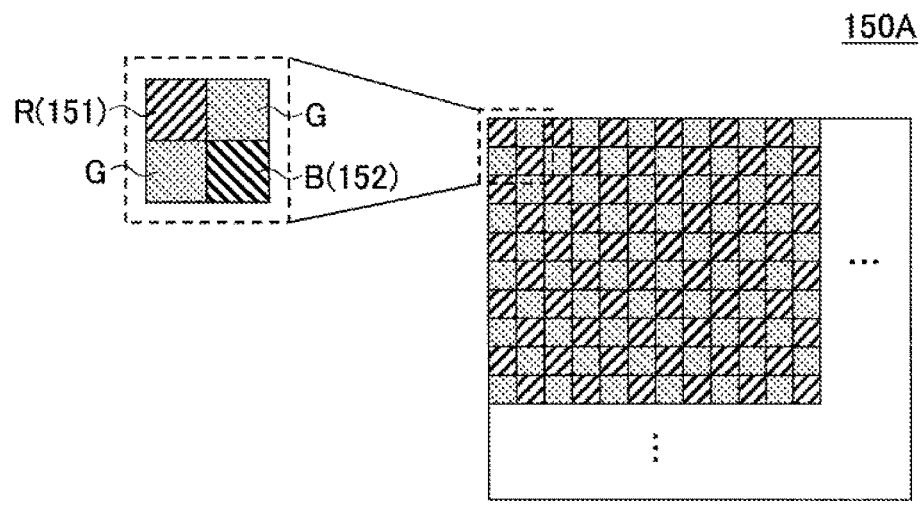
FIG. 8 is a diagram illustrating an example of an RGB filter.

FIG. 8 is a diagram illustrating an example of an RGB (Red, Green, Blue) filter. An RGB filter 150A illustrated in FIG. 8 may be used in place of the filter 150 illustrated in FIG. 5, in each of the second embodiment illustrated in FIG. 4 and the third embodiment illustrated in FIG. 6. In other words, as illustrated on an enlarged scale for a top left part of the RGB filter 150A surrounded by a dotted line in FIG. 8, the RGB filter 150A includes an R (Red) filter indicated by R, a G (Green) filter indicated by G, and a B (Blue) filter indicated by B, for each pixel of the light receiving element of the camera. In this example, the R filter also functions as the long-wavelength filter 151, and the B filter also functions as the short-wavelength filter 152.

A complementary color filter, such as an YMC (Yellow, Magenta, Cyan) filter, may be used in place of a primary color filter, such as the RGB filter. When the RGB filter is used, it is possible to more easily reproduce sharp colors when compared to the case in which the YMC filter is used. On the other hand, when the YMC filter is used, it is possible to obtain a brighter image because an amount of transmitting light increases due to light colors when compared to the case in which the RGB filter is used.

Figure 9:
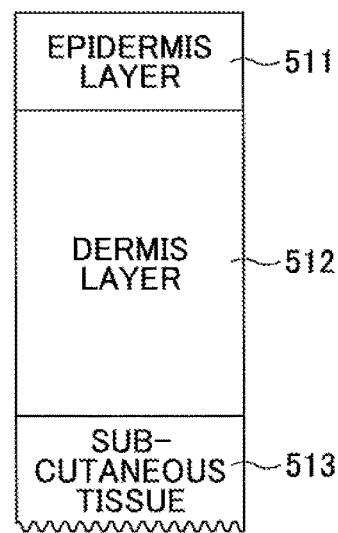
FIG. 9 is a diagram illustrating an example of a multi-layered structure of skin.

Next, a description will be given of selection of wavelength of light having mutually different wavelengths. FIG. 9 is a diagram illustrating an example of a multi-layered structure of skin. For example, according to Takaaki Maeda et al., "Monte Carlo Simulation of Spectral Reflectance Using Multilayered Skin Tissue Model", Optical Review Vol. 17, No. 3, (2010), pp. 223-229, the skin has the multi-layered structure illustrated in FIG. 9. As illustrated in FIG. 9, the skin includes an epidermis layer 511 having a thickness of approximately 100 μm, a dermis layer 512 having a thickness of approximately 1.5 mm, and a subcutaneous tissue 513. The veins are located within the subcutaneous tissue 513 that is 1.5 mm or deeper from the surface of the epidermis layer 511 (that is, the skin surface).

Figure 10:
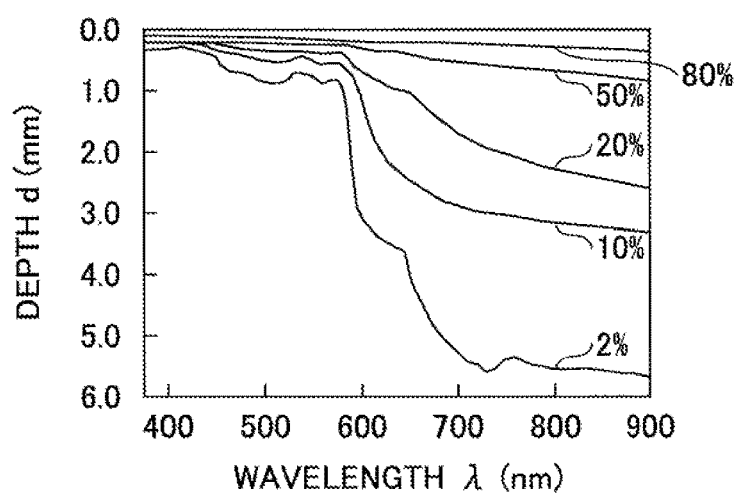
FIG. 10 is a diagram illustrating an example of a light penetration rate.

When light is irradiated on the biometric part, the longer the wavelength of the light, the more the light penetrates the skin and reaches deeper inside the biometric part. For this reason, the light having the long-wavelength is selected so that the light penetrates the skin and reaches inside the biometric part where the veins are located, that is, the inside that is 1.5 mm or deeper from the skin surface. FIG. 10 is a diagram illustrating an example of a light penetration rate. In FIG. 10, the ordinate indicates a depth d (mm) from the skin surface, and the abscissa indicates a wavelength λ (nm) of the light. In addition, "2%", "10%", "20%", "50%", and "80%" added to plots illustrated in FIG. 10 indicate the light penetration rates (%) of the amount of incoming light that penetrates the skin and reaches the respective depths inside the biometric part.

The light having the long-wavelength has a wavelength longer than 600 nm. For example, according to Yoshinaga Aizu, "Skin Tissue Multilayered Structure Modeling and Light Propagation Simulation", Journal of the Japan Society of Mechanical Engineers (JSME), 2011.7, Vol. 114, No. 1112, p. 39, it is preferable to select the wavelength of the light having the long-wavelength (red to near-infrared wavelength range) to 700 nm or longer.

On the other hand, the light having the short-wavelength has a wavelength of 600 nm or shorter. The wavelength of the light having the short-wavelength is selected so that the light is reflected or scattered at the skin surface, and only penetrates the skin surface and can only reach a shallow region from the skin surface. It is preferable to select the wavelength of the light having the short-wavelength in a range of 300 nm to 600 nm (blue to green wavelength range), for example.

The wavelength of the light irradiated on the biometric part may have a single spectrum. However, in order to obtain light having a high monochromaticity, a device such as a laser device may be used. When light having a narrow bandwidth is to be emitted from a lamp (or bulb), an LED (Light Emitting Diode), or the like, a wavelength filter is used to limit the band and the amount of light is decreased thereby. In each of the embodiments described above, the two wavelengths that are used simply need to cause the light having the two wavelengths to reach mutually different depths of the biometric part. The two wavelengths of the light do not necessarily need to have a single spectrum, and the light having the long-wavelength is possible to use light having a bandwidth of 700 nm to 900 nm, for example. In addition, in a case in which a plurality of spectral light are combined and used, the light having the short-wavelength may be a combination of light having a wavelength of 400 nm and light having a wavelength of 500 nm, for example.

Next, a description will be given of an operation of the computing device 132 that computes the difference between the two images. When the light having the two wavelengths selected as described above is irradiated on the biometric part and the image of the biometric part is captured and observed, it is possible to obtain two images, namely, the image caused by the light having the long-wavelength and the image caused by the light having the short-wavelength. The light having the short-wavelength penetrates the surface of the biometric part but only reaches the shallow region of the biometric part. Hence, the image caused by the light having the short-wavelength only includes surface information related to a vicinity of the surface of the biometric part. On the other hand, the light having the long-wavelength penetrates the surface of the biometric part and not only reaches the shallow region of the biometric part, but also reaches a deep region of the biometric part. In other words, the returning light from the biometric part with respect to the light having the long-wavelength includes returning light from the shallow region close to the surface of the biometric part, and returning light from the deep region further (or deeper) inside the biometric part from the surface of the biometric part relative to the shallow region. For this reason, the image caused by the light having the long-wavelength includes both the surface information, and internal information related to the inside of the biometric part. The surface information included in and observed on the image caused by the light having the long-wavelength corresponds to the surface information included in and observed on the image caused by the light having the short-wavelength. Accordingly, it is possible to extract the internal information of the biometric part, that is, an image of vein information within the skin tissue, by subtracting from the image caused by the light having the long-wavelength, the image in which the luminance of the second image caused by the light having the short-wavelength, is attenuated, according to the following formula (1). In the formula (1), $I_v$ denotes an image of the vein information, $I_{lw}$ denotes the image caused by the light having the long-wavelength, $I_{sw}$ denotes the image caused by the light having the short-wavelength, and κ denotes a coefficient. The coefficient κ is a value that is less than 1, and represents the attenuation rate of the luminance of the image $I_{sw}$ caused by the light having the short-wavelength. The attenuation rate at which the luminance of the image caused by the light having the short-wavelength is attenuated may be determined according to the intensity of a component of the surface information (that is, surface reflection light) included in the image caused by the light having the long-wavelength.

$$I_v = I_{lw} - \kappa \cdot I_{sw} \quad (1)$$

As described above, when obtaining the difference between the image $I_{lw}$ caused by the light having the long-wavelength and the image $I_{sw}$ caused by the light having the short-wavelength, it is preferable to adjust and match the luminance of the image $I_{sw}$ caused by the light having the short-wavelength to the luminance of the image $I_{lw}$ caused by the light having the long-wavelength. The coefficient κ depends on the wavelength range of the two illumination light used, a spectral sensitivity of the camera used, a spectral reflectivity of the skin, or the like. For the sake of convenience, it is assumed in this example that the light used, having the wavelengths including a wavelength of 500 nm and a wavelength of 800 nm, is emitted from a monochromatic light source. It is also assumed that the coefficient κ is adjusted, so that luminance distributions (or histograms) of the images caused by the light having the two different wavelengths become approximately the same.

The image that is observed represents a two-dimensional spatial distribution of the returning light from the biometric part irradiated with the light. When light is irradiated on the biometric part and an image, caused by returning light from the biometric part after the irradiated light penetrates and reaches inside the biometric part to a depth z from the surface of the biometric part, is denoted by Img(z), the observed image becomes an overlap of images caused by returning light from the respective depths. When the overlap of the images at the depths z=a to b of the biometric part is represented by the following formula (2), the observed image becomes an overlap I[0, dmax] of the images at the depths from a depth 0 to a maximum penetration depth dmax.

$$I[a, b] = \sum_{z=a}^{b} Img(z) \quad (2)$$

From FIG. 10, in the case of the light having the wavelength of 500 nm, the light penetrating the biometric part and reaching the depth of 1 mm from the surface of the biometric part is less than 2% of the amount of incoming light (that is, the light penetration rate is less than 2%), and almost all of the light returns from a depth of 1 mm or less. For this reason, the following formula (3) stands.

$$I500[0, dmax] \approx I500[0, 1 mm] \quad (3)$$

On the other hand, in the case of the light having the wavelength of 800 nm, the light penetrates the biometric part and reaches the depth of 1 mm or more from the surface of the biometric part. Hence, the following formula (4) stands.

$$I800[0, dmax] = I800[0, 1 mm] + I800[1 mm, dmax] \quad (4)$$

In the formulas (3) and (4), I500[0, 1 mm] and I800[0, 1 mm] are images observed from the same layer of the biometric part, and only the luminance (that is, brightness) differs between the two images. Accordingly, the following formula (5) stands.

$$I800[0, 1 mm] = \kappa \cdot I500[0, 1 mm] \quad (5)$$

In addition, the formula (5) above can be replaced by the following formula (6).

$$I800[0, dmax] = \kappa \cdot I500[0, 1 mm] + I800[1 mm, dmax] \quad (6)$$

Further, the following formula (7) can be obtained from the formula (3) and the formula (6) described above.

$$I800[0, dmax] \approx \kappa \cdot I500[0, dmax] + I800[1 mm, dmax] \quad (7)$$

The formula (7) described above is equivalent to the following formula (8).

$$I800[1 mm, dmax] \approx I800[0, dmax] - \kappa \cdot I500[0, dmax] \quad (8)$$

In the formula (8), I800[1 mm, dmax] is an overlap of the images at the depths of 1 mm or more, and partially includes a deep portion of the dermis layer 512. However, the image of the subcutaneous tissue 513 where the veins are located is the image of the vein pattern.

From FIG. 10, in the case of the light having the wavelength of 800 nm, the light penetrating the biometric part and reaching the depth of 1 mm from the surface of the biometric part is 40% of the amount of incoming light (that is, the light penetration rate is 40%). In addition, the light penetrating the biometric part and reaching the depth of 1 mm or more from the surface of the biometric part is 60% of the amount of incoming light (that is, the light penetration rate is 60%). When it is assumed that all of the light penetrating and reaching inside the biometric part can be observed as the returning light, in the formula (4) described above, κ·I500[0, 1 mm] may be regarded as being 60% of the brightness of I800[0, dmax], and thus, the coefficient κ that is used may be κ=0.6.

In a case in which polarization filters are arranged so that the polarization direction at the illumination end and the polarization direction at the observation end are perpendicular to each other (that is, the polarization filters are arranged perpendicularly to each other) to perform separation by polarization, the amount of light decreases. In principle, the amount of light decreases by ½×½ or more (that is, decreases to 25% or less), and an effective amount of light attenuates to 20% or less. However, in the example described above, the luminance of the image $I_{sw}$ caused by the light having the short-wavelength is adjusted to the luminance of the image $I_{lw}$ caused by the light having the long-wavelength. In other words, the image in which the luminance of the image $I_{sw}$ caused by the light having the short-wavelength is attenuated using the coefficient κ that is κ=0.6, is subtracted from the image $I_{lw}$ caused by the light having the long-wavelength. As a result, the attenuation of the intensity of light is suppressed to 40%, and the intensity of light can be improved to approximately two times that obtainable in the case in which the separation by polarization is employed. In addition, an SNR (Signal-to-Noise Ratio) can be improved to approximately two times that obtainable in the case in which the separation by polarization is employed.

In order to match the luminance distributions (or histograms) of the images captured by the imaging device, the illumination intensity, the spectral sensitivity of the camera, the spectral reflectivity of the skin, or the like need to be adjusted. However, particularly the spectral reflectivity of the skin differs depending on the user, and it is difficult to perform the adjustments solely by the imaging device. For this reason, the luminance distribution may be adjusted using a level adjustment of an image processing. By using the image processing, it becomes possible to cope with a slight change in input caused by individual differences amongst users. In a case in which the spectral properties greatly differ, the SNR of the image deteriorates due to luminance variations. In this case, it is desirable to perform the adjustments at the imaging device as much as possible, so that the spectral properties become uniform. Generally, the spectral property of the camera is determined by the light receiving element and the filter, and it may be practical to perform the adjustments according to a ratio of intensities of the illumination light.

In the example described above, the coefficient κ that is used is κ=0.6. However, in a case in which illumination light having other wavelengths is used, or the illumination light is not from a monochromatic light source and is from a light source that emits light having a wavelength in a certain wavelength range, the value of the coefficient κ is determined again since the difference between the penetration depths of the light becomes different. The value of the coefficient κ may be determined from computation, or based on a value actually measured with reference to a particular sample.

In order to make an inexpensive biometric image processing apparatus, it is conceivable to use a generally available RGB camera for the imaging device. In a case in which the light having the wavelength of 500 nm and the light having the wavelength of 800 nm are irradiated on the biometric part as in the example described above, and the image of the biometric part is captured by the RGB camera, the light having the wavelength of 500 nm is observable only by a G-plane, however, the light having the wavelength of 800 nm is observable in all of R-plane, G-plane, and B-plane (that is, by all of RGB planes). To be more precise, the light having the wavelength of 500 nm is slightly observable by the R-plane and the B-plane. This is because dyes used for the RGB filter transmits the wavelengths in the near-infrared range. In this case, the image caused by the light having the short-wavelength of 500 nm cannot be observed solely by the G-plane, and a combination of the image caused by light having the short-wavelength and the image caused by the light having the long wave-length is observed by the G-plane. For this reason, a ratio of the light having the short-wavelength and the light having the long-wavelength, observable by the G-plane, may be obtained from the spectral sensitivity of the G filter and the spectral sensitivity of the light imaging device, and this ratio may be reflected to the value of the coefficient κ. For example, the image caused by the light having the short-wavelength may be captured by a camera having the G-plane with a spectral sensitivity of 4:1 for the light having the wavelength of 500 nm and the light having the wavelength of 800 nm. In this case, the image caused by the light having the long-wavelength may be observed by the R-plane, and no component of the light having the short-wavelength is included in the observed image. First, the component of the light having the long-wavelength is removed from the image observed by the G-plane, and an image of a G'-plane including only the component of the short-wavelength is obtained from the following formula (9).

$$G' = G - 0.2R \tag{9}$$

Next, a vein image (or vein pattern image) V is obtained from the following formula (10).

$$\begin{aligned} V &= R - 0.6G' \\ &= R - 0.6(G - 0.2R) \\ &= R + 0.12R - 0.6G \\ &= 1.12R - 0.6G \end{aligned} \tag{10}$$

A vein image (or vein pattern image) V' may be obtained from the following formula (11).

$$V' = R - 0.54G \tag{11}$$

Accordingly, even in a case in which a degree of separation of the observed images is relatively low, it is possible to acquire a clear image of the vein (vein pattern).

According to each of the embodiments described above, it is possible to obtain a clear biometric image. In addition, it is possible to use an inexpensive light source or an inexpensive camera. For this reason, compared to a case in which the polarization filters are used, for example, it is possible to acquire the clear biometric image at a lower cost. In other words, it is possible to provide an inexpensive technique for capturing and acquiring a clear image of the internally scattered light eliminated of the surface reflection.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," "second," "third," or "fourth," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric image processing apparatus comprising:
   an imaging device configured to capture a first image of a biometric part that is irradiated with light having a first wavelength, and a second image of the biometric part irradiated with light having a second wavelength shorter than the first wavelength; and
   a computing device configured to attenuate a luminance of the second image by an attenuation rate, and compute a third image by subtracting, from the first image, the second image having the luminance attenuated by the attenuation rate,
   wherein the attenuation rate of the second image is determined according to an intensity of a component of surface reflection light included in the first image.

2. The biometric image processing apparatus as claimed in claim 1, wherein the computing device determines the attenuation rate of the second image according to the intensity of the component of surface reflection light included in the first image, the first wavelength is longer than 600 nm, and the second wavelength is 600 nm or shorter, and the third image is a vein image.

3. The biometric image processing apparatus as claimed in claim 1, further comprising:

a light source configured to irradiate, on the biometric part, light having wavelengths including the first wavelength and the second wavelength; and a separator configured to separate returning light from the biometric part into a first component having the first wavelength and a second component having the second wavelength, wherein the imaging device includes a first camera configured to capture the first image based on the first component separated by the separator, and a second camera configured to capture the second image based on the second component separated by the separator.

4. The biometric image processing apparatus as claimed in claim 3, wherein the separator includes a prism configured to receive the returning light from the biometric part, a first optical wavelength filter configured to transmit the first component of the returning light separated by the prism, and a second optical wavelength filter configured to transmit the second component of the returning light separated by the prism, wherein the first camera and the second camera are arranged so that optical axes thereof match.

5. The biometric image processing apparatus as claimed in claim 1, further comprising:

a light source configured to irradiate, on the biometric part, light having wavelengths including the first wavelength and the second wavelength;

a first filter configured to transmit a first component having the first wavelength and to cut a second component having the second wavelength, of returning light from the biometric part; and a second filter configured to transmit the second component and to cut the first component, of the returning light from the biometric part, wherein the imaging device includes a camera configured to capture the first image based on the first component transmitted through the first filter, and to capture the second image based on the second component transmitted through the second filter.

6. The biometric image processing apparatus as claimed in claim 5, further comprising:

an RGB filter that includes the first filter and the second filter.

7. The biometric image processing apparatus as claimed in claim 1, further comprising:

a first light source configured to irradiate the biometric part with light having the first wavelength;

a second light source configured to irradiate the biometric part with light having the second wavelength; and a controller configured to alternately turn on the first light source and the second light source, wherein the imaging device captures the first image based on a component having the first wavelength of the returning light from the biometric part, while the controller turns on the first light source, and captures the second image based on a component having the second wavelength of the returning light from the biometric part while the controller turns on the second light source.

8. The biometric image processing apparatus as claimed in claim 1, further comprising:

a first light source configured to irradiate the biometric part with light having the first wavelength;

a second light source configured to irradiate the biometric part with light having the second wavelength;

a first filter configured to transmit a first component having the first wavelength and to cut a second component having the second wavelength, of returning light from the biometric part; and a second filter configured to transmit the second component and to cut the first component, of the returning light from the biometric part, wherein the imaging device includes a camera configured to capture the first image based on the first component transmitted through the first filter, and to capture the second image based on the second component transmitted through the second filter.

9. The biometric image processing apparatus as claimed in claim 8, further comprising:

an RGB filter that includes the first filter and the second filter.

10. The biometric image processing apparatus as claimed in claim 1, wherein the computing device normalizes a luminance level of the second image according to a luminance level of the first image.

11. A biometric image processing method comprising:

capturing, by an imaging device, a first image of a biometric part that is irradiated with light having a first wavelength, and a second image of the biometric part irradiated with light having a second wavelength shorter than the first wavelength; and computing, by a computing device, the second image having a luminance thereof attenuated by an attenuation rate, and a third image by subtracting, from the first image, the second image having the luminance attenuated by the attenuation rate, wherein the attenuation rate of the second image is determined according to an intensity of a component of surface reflection light included in the first image.

12. The biometric image processing method as claimed in claim 11, wherein the computing determines, by the computing device, the attenuation rate of the second image according to the intensity of the component of surface reflection light included in the first image, the first wavelength is longer than 600 nm, and the second wavelength is 600 nm or shorter, and the third image is a vein image.

13. The biometric image processing method as claimed in claim 11, further comprising:

irradiating on the biometric part, by a light source, light having wavelengths including the first wavelength and the second wavelength; and separating, by a separator, returning light from the biometric part into a first component having the first wavelength and a second component having the second wavelength, wherein the capturing captures the first image by a first camera of the imaging device based on the first component separated by the separating, and captures the second image by a second camera of the imaging device based on the second component separated by the separating.

14. The biometric image processing method as claimed in claim 11, further comprising:
  irradiating on the biometric part, by a light source, light having wavelengths including the first wavelength and the second wavelength;
  of returning light from the biometric part, transmitting a first component having the first wavelength and cutting a second component having the second wavelength, by a first filter; and
  of the returning light from the biometric part, transmitting the second component and cutting the first component, by a second filter,
  wherein the capturing captures, by a camera of the imaging device, the first image based on the first component transmitted through the first filter, and the second image based on the second component transmitted through the second filter.

15. The biometric image processing method as claimed in claim 14, which uses an RGB filter that includes the first filter and the second filter.

16. The biometric image processing method as claimed in claim 11, further comprising:
  irradiating the biometric part, by a first light source, with light having the first wavelength;
  irradiating the biometric part, by a second light source, with light having the second wavelength; and
  controlling, by a controller, the first light source and the second light source to alternately turn on the first light source and the second light source,
  wherein the capturing captures, by a camera of the imaging device, the first image based on a component having the first wavelength of the returning light from the biometric part, while the controller turns on the first light source, and the second image based on a component having the second wavelength of the returning light from the biometric part while the controller turns on the second light source.

17. The biometric image processing method as claimed in claim 11, further comprising:
  irradiating the biometric part, by a first light source, with light having the first wavelength;
  irradiating the biometric part, by a second light source, with light having the second wavelength;
  of returning light from the biometric part, transmitting a first component having the first wavelength and cutting a second component having the second wavelength, by a first filter; and
  of the returning light from the biometric part, transmitting the second component and cutting the first component, by a second filter,
  wherein the capturing captures, by a camera of the imaging device, the first image based on the first component transmitted through the first filter, and the second image based on the second component transmitted through the second filter.

18. The biometric image processing method as claimed in claim 17, which uses an RGB filter that includes the first filter and the second filter.

19. The biometric image processing method as claimed in claim 11, wherein the computing includes normalizing, by the computing device, a luminance level of the second image according to a luminance level of the first image.

20. The biometric image processing apparatus as claimed in claim 1, wherein the computing device computes the third image according to a formula $I_v = I_{lw} - \kappa \cdot I_{sw}$, where $I_v$ denotes the third image, $I_{lw}$ denotes the first image, $I_{sw}$ denotes the second image, and $\kappa$ denotes a coefficient that is less than 1 and represents the attenuation rate of the luminance of the second image $I_{sw}$ caused by the light having the second wavelength, determined according to an intensity of a component of surface reflection light included in the first image $I_{lw}$ caused by the light having the first wavelength.

* * * * *